United States Patent [19]

Henson

[11] 4,166,870

[45] Sep. 4, 1979

[54] MANUFACTURE OF ELECTRODES FOR ELECTROCHEMICAL CELLS

[75] Inventor: Kenneth Henson, Ramsbottom, England

[73] Assignee: Unigate Limited, London, England

[21] Appl. No.: 839,057

[22] Filed: Oct. 3, 1977

Related U.S. Application Data

[63] Continuation of Ser. No. 745,271, Nov. 26, 1976, abandoned, which is a continuation of Ser. No. 500,780, Aug. 26, 1974, abandoned.

[30] Foreign Application Priority Data

Aug. 24, 1973 [GB] United Kingdom ............... 40300/73

[51] Int. Cl.$^2$ ..................... H01M 4/04; H01M 4/74
[52] U.S. Cl. .................................. 427/122; 427/370; 429/242; 429/245; 429/218
[58] Field of Search ............... 427/122, 195, 369, 370; 204/290 R; 136/120; 429/242, 245, 218

[56] References Cited

U.S. PATENT DOCUMENTS 2,582,744   11/1952   Brennan ........................... 427/369

FOREIGN PATENT DOCUMENTS 609942   4/1953   United Kingdom ............. 427/122
1258502  12/1971  United Kingdom ............. 427/122

*Primary Examiner*—Ralph S. Kendall
*Attorney, Agent, or Firm*—Sughrue, Rothwell, Mion, Zinn and Macpeak

[57] ABSTRACT

A process of manufacturing an electrode for a zinc halogen electric cell comprising forming a first mix of 20–100 grams of 50% compressed acetylene black, 450–750 ml. water, about 5 ml. acetone, and if desired 5 ml. of 30% zinc chloride solution by mixing gently, forming a second mix of 50 ml. latex and 50–250 ml. water, adding the second mix slowly to the first mix until the resultant mix is in crumbly form, applying a layer of this crumbly mix to a sheet of expanded anodizable metal or alloy or of including a metal or metals of Group IV(A) or V(A) and pressing the layer onto the metal sheet.

11 Claims, 2 Drawing Figures

MANUFACTURE OF ELECTRODES FOR ELECTROCHEMICAL CELLS

This is a Continuation of application Ser. No. 745,271, filed Nov. 26, 1976, now abandoned, which is in turn a continuation of Ser. No. 500,780, filed Aug. 26, 1974, also abandoned.

BACKGROUND OF THE INVENTION

1. Field of the Invention

This invention relates to a process for the manufacture of electrodes for electro-chemical cells such as zinc halogen electric cells and batteries made therefrom, the cathodic electrode being supported in an electrode storage structure formed of a substrate of an anodizable metal or metals of Group IV(A) or Group V(A) of the Periodic Table according to Mendeleef on which has been mounted a layer or layers of porous carbon by a binder of neoprene latex. In such cells the preferred halogen is chlorine and then the electrolyte is zinc chloride.

2. Description of Prior Art

Such an electrode is described in United Kingdom Letters Patent Specification No. 1,258,502 which describes bonding carbon powder with a resin such as nitrile resin latex.

It is known to cure or vulcanize neoprene using a metal oxide such as zinc oxide, the process being based on the bisalkylation theory of neoprene vulcanization as described by Peter Kovacic in "Industrial and Engineering Chemistry" Vol. 47, No. 5, pages 1090–1094 of May 1955. This theory postulates that the cross linking or curing of neoprene takes place at sites on the polymer chain where with chlorine as the halogen, there are tertiary allylic chlorine atoms formed by 1,2 polymerization of chloroprene monomer. This labile chlorine amounts to about 1.5% of the total chlorine in neoprene. The metal oxide, usually zinc oxide, initiates the curing process by reacting with chlorine present to form zinc chloride which is a catalyst for alkylation. Then zinc chloride with bi-functional organic compounds present in the polymer forms cross-links by bisalkylation at the reactive tertiary allylic chlorine sites of nearby polymer chains.

It has been found that by using zinc chloride solution in the mix formulation, in place of say calcium chloride, as proposed in Patent No. 1,258,502 a smooth precipitation of the neoprene latex is achieved. It is known that partial hydrolysis of zinc chloride solution on dilution of the same causes precipitation of zinc oxide or hydroxide. Such dilution occurs during the mixing procedure and therefore produces some zinc oxide to provide a vulcanizing means, and at the same time avoids inclusion of any extraneous impurities in the cured neoprene.

The main object of the present invention is to provide a process for manufacture of zinc halogen cell cathodic electrode support structure having a substrate of an anodizable metal or metals of Group IV(A) or V(A) of the Periodic Table of Mendeleef which has a porous carbon layer bonded thereto by a cured neoprene latex.

SUMMARY

According to the present invention, a process of manufacturing a porous electrode support structure for a zinc halogen electric cell comprises forming a first mix of 20–100 grams of 50% compressed acetylene black, 450–750 m. water, about 5 m. acetone, and, if desired, 5 ml. of 30% zinc chloride solution by mixing gently; forming a second mix of 50 ml. cured latex and 50–250 ml. water, adding the second mix slowly to the first mix until the resultant mix is in porous crumbly form applying a layer of this crumbly mix to a sheet of expanded anodizable metal or allow or of including a metal or metals of Group IV(A) or V(A) and pressing the layer onto the metal sheet. The metal sheet is preferably provided with a layer of crumb on each side.

DESCRIPTION OF PREFERRED EMBODIMENTS

A suitable pressure for causing adherence of the crumb to the metal sheet is 2.5 tons per square inch. The preferred thickness of the crumb layers is such as to give an electrode support structure of uniform appearance approximately 0.050 inch thickness.

A suitable metal for the mesh is titanium such as minimesh Type T1 1010-C or a coarser mesh known as Insect ×0.010 inch×329.

The electrode support structure is preferably heated during the process to about 140° C. for about 16 hours.

In order that the invention may be more fully understood it will now be further described with reference to the following Examples and Graphs 1 and 2.

EXAMPLE 1

A first mix was made with the following:

| |
|---|
| 20–100 g. acetylene black (50% compressed |
| 450–750 ml. water |
| 5 ml. acetone |
| 5 ml. 30% $ZnCl_2$ solution. |

Part A.

A second mix was made with the following:

| |
|---|
| 25–100 ml. Neoprene latex 950 |
| (a latex produced by E.I. dePont d'Nemours & Co.) |
| 50–250 ml. water |

Part B.

Part A was mixed at speed 1 on a Kenwood Chef mixer until smooth. Part B was then added slowly to give a uniform crumb. The appearance of the crumb at that point was highly uniform.

Carbon electrode plaques were made up by spreading uniform layer of the crumb into a press tool, placing titanium expanded metal on this layer, applying a second layer of mix of equal thickness to the first and pressing the sandwich at a pressure of 2.5 tons per square inch. The resultant cathodic electrode support structures were of uniform appearance and approximately 0.050" thickness.

Two types of titanium mesh were used:
(A) Minimesh Type T1 1010-C (a titanium mesh about 0.01 inches thick by 6 inches wide produced by Imperial Metal Industries, Ltd. of Radditch, England) and
(B) A somewhat coarser mesh of description: Insect×0.010"×329.

All plaques were heated to 140° C. for 16 hours.

Two types of tests were carried out on these electrode structures:

(a) A prolonged chlorination by anodization against a sheet of titanium in zinc chloride electrolyte, at a current density of 5 ma. cm$^{-2}$. This resulted in the electrode structure having acceptable mechanical strength, the tensile strength being a substantial improvement on that of other electrode structures for use in zinc halogen cells and batteries.

Moreover, compared with known electrode structures there was a marked reduction in the tendency of the electrodes to delaminate. The electrode support structure also has improved electrical performance, for example, an increase of the order of 200 mV.

Figure 1:
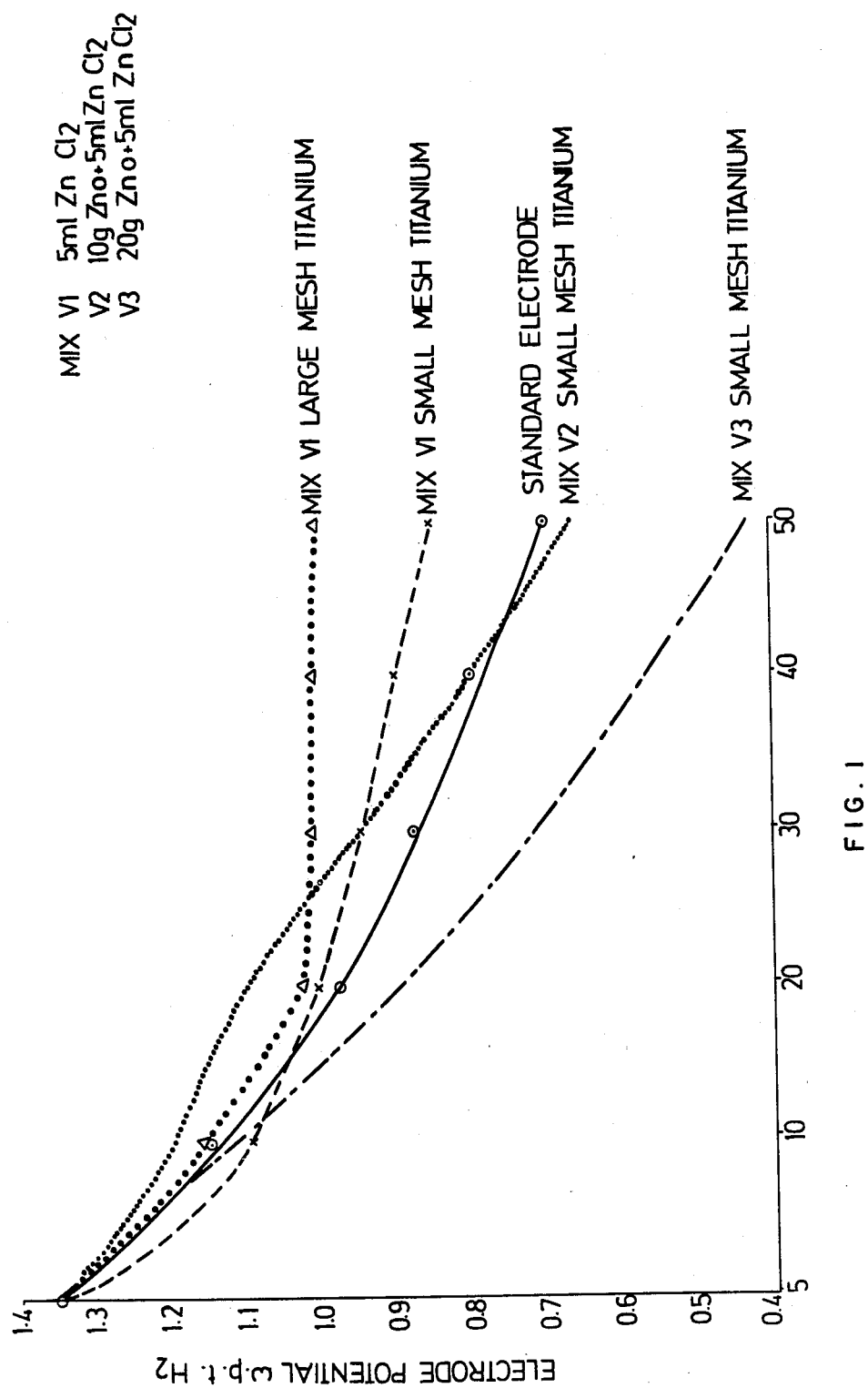
FIG. 1 shows a comparison of discharge tests for electrodes of the invention versus electrodes of conventional formulation.
Figure 2:
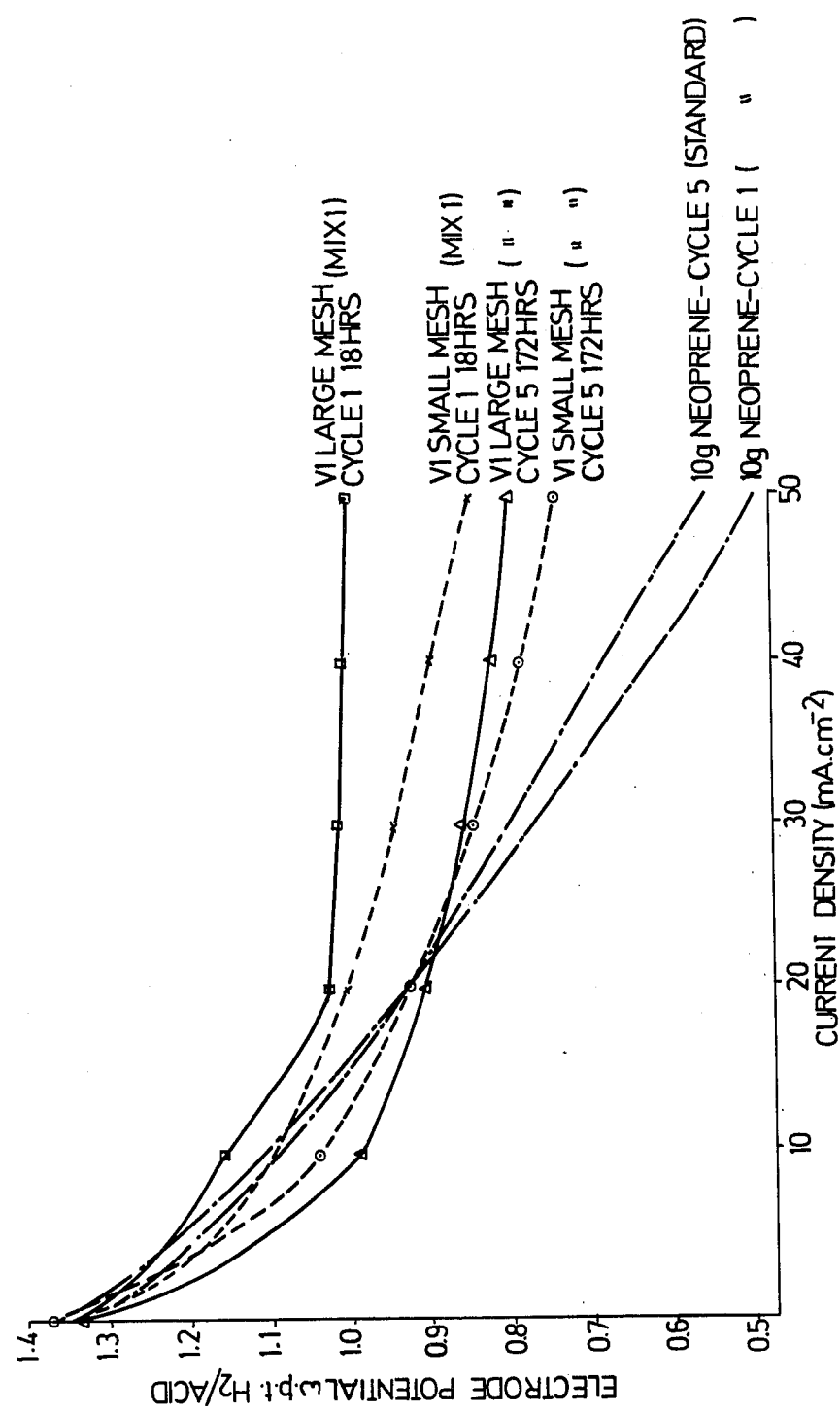
FIG. 2 shows the effects of cycling electrodes of the invention versus standard electrodes.

(b) A ½-cell charge/discharge test, with chlorine pressure, against a "Specpure" zinc rod counter electrode. Results for electrodes and electrode structure with both large and small mesh are shown in the accompanying FIG. 1 together with a comparative standard formulation result. A significant improvement was observed in cells having the characteristics of this Example, particularly in the case of the larger mesh, as indicated on FIG. 1. Graph 2 showed the sustained improvement in performance of the electrode structure formulation compared to the previous standard electrode structure formulation for 5 cycles of charge and discharge.

EXAMPLE 2

| 20-100 g. acetylene black (50% compressed) 450-750 ml. water  5 ml. 30% ZnCl₂ solution 5 ml. acetone | Part A. |
|---|---|

| 25-100 ml. Neoprene latex 950 50-250 ml. water 0.5 g. Antioxidant 2246 (ex Anchor Chemical Ltd.) 0.5 g. Accelerator (thiocarbanilide) | Part B. |
|---|---|

Mixing procedure was as for Example 1 except that Part B was shaken thoroughly to disperse the additives. Vulcanization of electrode structures on both large and small titanium mesh was carried out at 104° C. for 16 hours.

EXAMPLE 3

| 20-100 g. acetylene black 450-750 ml. water 5 ml Acetone | Part B. |
|---|---|

| 20-80 ml. Butyl Latex BP 100 (ex Enjay Chemical Co.) 50-200 ml. water 0.75 g. Sulphur 1.0 Antioxidant 2246 | Part B. |
|---|---|

Mixing procedure and production was as in Example 1.

EXAMPLE 4

| 20-100 g. acetylene black 450-750 ml. water 5 ml Acetone | Part B. |
|---|---|

| 20-83 ml. Intolan 255 latex a polythene rubber marketed by International Synthetic Rubber Co., Ltd. of Southampton, England 1.25 g. Zinc Oxide 0.3 g. Sulphur. | Part B. |
|---|---|

Mixing procedure and production was as in Example 1.

It has been observed that the best result on mixing was obtained by the use of an ortibal-type mixer and larger scale production would be performed with the use of such a mixer. Mixers of other types, especially where there is an element of grinding or beating have been found much less satisfactory.

I claim:

1. A process of manufacturing a porous electrode support structure for a zinc halogen electric cells, comprising forming a first mix of 20-100 grams of 50% compressed acetylene black, 450-750 ml. water and 5 ml. of acetone by mixing gently, forming a second mix of 50 ml. latex and 50-250 ml. water, adding said second mix slowly to said first mix while continuing to mix gently such that the resulting mix is in porous crumbly form, applying a layer of said crumbly mix to a sheet of expanded anodizable metal selected from at least one metal of Groups IV(A) and V(A) of the Periodic Table according to Mendeleef, and applying said crumbly mix layer to said metal sheet under a pressure of about 2.5 tons per square inch, said crumbly mix layer being of sufficient thickness to produce an electrode having a thickness of about 0.050 inch.

2. A process according to claim 1, wherein 5 ml. of 30% zinc chloride solution is added to said first mix.

3. A process according to claim 1, wherein said metal sheet is provided with a layer of said porous crumbly mix on each side thereof.

4. A process according to claim 1, wherein during the process the electrode is heated to about 140° C. for about 16 hours.

5. A process according to claim 1, wherein said metal sheet is made of titanium.

6. A process according to claim 1, wherein said metal sheet is made of a mesh of titanium.

7. A process according to claim 1, wherein said first mix comprises 20-100 g. acetylene black 50% compressed, 450-750 ml. water, 5 ml acetone and 5 ml 30% zinc chloride solution, said second mix comprises 25-100 ml. Neoprene latex 950 and 50-250 ml. water, said first mix is mixed in a container with a stirrer to form a uniform mix, said second mix is added slowly to form a uniform porous crumbly mix, said crumbly mix is spread uniformly onto a press tool, a sheet of expanded titanium sheet is disposed over said first spread, a second layer of said crumbly mix of equal thickness to said first is spread over said titanium sheet, and said spreads and titanium sheet are compressed under 2.5 tons per square inch to a thickness of 0.050 inch, said pressed sandwich being heated at 140° C. for 16 hours.

8. A process according to claim 1, wherein said first mix comprises 20–100 g. acetylene black 50% compressed, 450–750 ml. water, 5 ml. 30% zinc chloride solution and 5 ml. acetone, said second mix comprises 25–100 ml. Neoprene latex 950, 50–250 ml. water, 0.5 g. Antioxidant 2246 and 0.5 g. thiocarbanilide accelerator, said second mix is agitated to disperse the additives uniformly therein, said uniform second mix is added slowly to said first mix to form a uniform crumb, said crumb is applied evenly over both faces of an expanded titanium sheet to form a sandwich, said sandwich is pressed under 2.5 tons per square inch to a thickness of 0.050 inch, and said sandwich is heated at about 104° C. for 16 hours.

9. A process according to claim 1, wherein said first mix comprises 20–100 g. acetylene black, 450–750 ml. water, 5 ml. acetone, said second mix comprises 20–80 ml. butyl latex BP100, 50–200 ml. water, 0.75 g. sulphur and 1.0 g. antioxidant 2246, said second mix is agitated to disperse the additives uniformly therein, said uniform second mix is added slowly to said first mix to form a uniform porous crumb, said crumb is applied evenly over both faces of an expanded titanium sheet to form a sandwich, said sandwich is pressed under 2.5 tons per square inch to a thickness of 0.050 inch, and said sandwich is heated at about 140° C. for 16 hours.

10. A process according to claim 1, wherein said first mix comprises 20–100 acetylene black, 450–750 ml. water and 5 ml acetone, said second mix comprises 20–83 ml. Intolan 255 latex, 1.25 g. zinc oxide and 0.3 g. sulphur, said second mix is agitated to disperse the additives uniformly therein, said uniform second mix is added slowly to said first mix to form a uniform porous crumb, said crumb is applied evenly over both faces of an expanded titanium sheet to form a sandwich, said sandwich is pressed under 2.5 tons per square inch to a thickness of 0.050 inch, and said sandwich is heated at about 140° C. for 16 hours.

11. The process of claim 1 wherein when said first mix is added to said second mix the mixing thereof is under conditions equivalent to those exerted by a Kenwood Chef mixer operated at speed 1.

* * * * *